US011599375B2

(12) United States Patent
Liu et al.

(10) Patent No.: US 11,599,375 B2
(45) Date of Patent: Mar. 7, 2023

(54) SYSTEM AND METHOD VIRTUAL APPLIANCE CREATION (71) Applicant: EMC IP Holding Company LLC, Hopkinton, MA (US)

(72) Inventors: Min Liu, Shanghai (CN); James Morton, Adamstown, MD (US); Ming Zhang, Shanghai (CN); Lihui Su, Shanghai (CN); Yubing Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 340 days.

(21) Appl. No.: 16/780,435

(22) Filed: Feb. 3, 2020

(65) Prior Publication Data
US 2021/0240508 A1 Aug. 5, 2021

(51) Int. Cl.
*G06F 9/455* (2018.01)
*G06F 9/4401* (2018.01)

(52) U.S. Cl.
CPC ........ *G06F 9/45558* (2013.01); *G06F 9/4406* (2013.01)

(58) Field of Classification Search
CPC .................................................. G06F 9/45558
See application file for complete search history.

(56) References Cited

U.S. PATENT DOCUMENTS

| 8,566,821 | B2 * | 10/2013 | Robinson | G06F 9/485 718/1 |
| 9,830,177 | B1 * | 11/2017 | Mahapatra | G06F 9/455 |
| 2006/0010485 | A1 * | 1/2006 | Gorman | H04L 67/34 726/3 |
| 2007/0300220 | A1 * | 12/2007 | Seliger | H04L 67/34 718/1 |
| 2008/0155223 | A1 * | 6/2008 | Hiltgen | G06F 9/45558 718/1 |
| 2009/0125902 | A1 * | 5/2009 | Ghosh | G06F 9/45533 718/1 |
| 2009/0300076 | A1 * | 12/2009 | Friedman | G06F 11/3664 707/999.203 |
| 2011/0010714 | A1 * | 1/2011 | Powell | G06F 9/4401 718/1 |
| 2011/0265076 | A1 * | 10/2011 | Thorat | G06F 9/45533 718/1 |
| 2011/0296412 | A1 * | 12/2011 | Banga | G06F 9/45545 718/1 |
| 2012/0005672 | A1 * | 1/2012 | Cervantes | G06F 9/5077 718/1 |
| 2012/0054736 | A1 * | 3/2012 | Arcese | G06F 8/65 717/172 |
| 2012/0159232 | A1 * | 6/2012 | Shimada | G06F 16/183 714/E11.006 |

(Continued)

*Primary Examiner* — Mehran Kamran
(74) *Attorney, Agent, or Firm* — Chamberlain, Hrdlicka, White, Williams & Aughtry (57) ABSTRACT Methods and systems for generating virtual appliance products. The techniques include obtaining an operating system virtual disk file; creating a configuration file to include a first reference to the operating system virtual disk file and a second reference to a product-specific disk file; generating a virtual appliance file including the configuration file, the operating system virtual disk file, and the product-specific disk file; and distributing the virtual appliance file to a user.

15 Claims, 5 Drawing Sheets

(56) References Cited

U.S. PATENT DOCUMENTS

| | | | |
|---|---|---|---|
| 2013/0007726 A1* | 1/2013 | Poddar | G06F 8/63 717/174 |
| 2013/0132950 A1* | 5/2013 | McLeod | G06F 9/45558 718/1 |
| 2013/0227089 A1* | 8/2013 | McLeod | G06F 9/45558 709/220 |
| 2013/0276068 A1* | 10/2013 | Alwar | H04L 63/10 726/4 |
| 2013/0297922 A1* | 11/2013 | Friedman | G06F 8/63 713/2 |
| 2014/0007120 A1* | 1/2014 | Spitz | G06F 9/44 718/102 |
| 2015/0039875 A1* | 2/2015 | Di Cocco | G06F 9/4416 713/2 |
| 2015/0046926 A1* | 2/2015 | Kenchammana-Hosekote | G06F 9/45558 718/1 |
| 2015/0052527 A1* | 2/2015 | Li | G06F 9/45558 718/1 |
| 2015/0095597 A1* | 4/2015 | Ayanam | G06F 3/067 711/162 |
| 2015/0143374 A1* | 5/2015 | Banga | G06F 21/53 718/1 |
| 2015/0339157 A1* | 11/2015 | Lent | G06F 16/1824 718/1 |
| 2016/0019077 A1* | 1/2016 | Ourfali | G06F 9/5077 718/1 |
| 2016/0098288 A1* | 4/2016 | Petrov | G06F 9/45558 718/1 |
| 2017/0262307 A1* | 9/2017 | Venkatesh | G06F 9/45533 |
| 2018/0113730 A1* | 4/2018 | Pearson | H04L 9/083 |
| 2018/0365046 A1* | 12/2018 | S S | G06F 1/3203 |
| 2019/0012184 A1* | 1/2019 | Feinberg | G06F 8/63 |
| 2019/0190776 A1* | 6/2019 | Bregman | H04L 41/0869 |
| 2020/0028879 A1* | 1/2020 | Lahiri | G06Q 10/0635 |
| 2020/0125731 A1* | 4/2020 | Benameur | G06F 9/45558 |
| 2020/0201616 A1* | 6/2020 | Mueller | G06F 9/45558 |
| 2021/0157623 A1* | 5/2021 | Chandrashekar | G06F 9/45558 |
| 2021/0397468 A1* | 12/2021 | Morton | G06F 8/71 |

\* cited by examiner

SYSTEM AND METHOD VIRTUAL APPLIANCE CREATION

BACKGROUND

Software applications are traditionally distributed as one or more files that an application user must install on an appropriate environment, such as a computing device executing an operating system. With the adoption of various virtualization techniques for computing environments, software may instead be distributed as a virtual appliance to be deployed in a virtualized environment (e.g., as one or more virtual machines on one or more host computing devices). However, creation of such virtual appliances may require creators of the virtual appliances to recreate efforts to achieve certain goals (e.g., having a hardened operating system) for the virtual appliance for each different virtual appliance even though the efforts are substantially similar between various virtual appliances.

SUMMARY

In general, in one embodiment, the invention relates to a method for generating virtual appliance products. In one or more embodiments, the method includes obtaining an operating system virtual disk file; creating a configuration file to include a first reference to the operating system virtual disk file and a second reference to a product-specific disk file; generating a virtual appliance file including the configuration file, the operating system virtual disk file, and the product-specific disk file; and distributing the virtual appliance file to a user.

In general, in one embodiment, the invention relates to a non-transitory computer readable medium including computer readable program code, which when executed by a computer processor enables the computer processor to perform a method for generating virtual appliance products. In one or more embodiments, the method includes obtaining an operating system virtual disk file; creating a configuration file to include a first reference to the operating system virtual disk file and a second reference to a product-specific disk file; generating a virtual appliance file that includes the configuration file, the operating system virtual disk file, and the product-specific disk file; and distributing the virtual appliance file to a user.

In general, in one embodiment, the invention relates to a system for generating virtual appliance products. In one or more embodiments, the system includes a processor, a memory, and, a product creation device executing on the processor. In one or more embodiments, the product creation device is configured to: obtain an operating system virtual disk file; create a configuration file to include a first reference to the operating system virtual disk file and a second reference to a product-specific disk file; generate a virtual appliance file that includes the configuration file, the operating system virtual disk file, and the product-specific disk file; and distribute the virtual appliance file to a user.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments of the invention relate to the creation of virtual appliances. Specifically, in one or more embodiments, various virtual appliances may be designed to include the same or substantially similar version of an operating system. Such an operating system may be configured as a certain version, have certain updates and/or patches applied, have been subjected to various operating system hardening techniques, etc. In one or more embodiments, requiring such an operating system to be generated separately for each virtual appliance leads to large amounts of redundant and unnecessary repetition of effort.

In one or more embodiments, embodiments described herein avoid such unnecessary redundancy of effort by separating the operating system generation process from the creation of a virtual appliance. Specifically, in one or more embodiments, for a given operating system with various modifications, such an operating system is created once, and then provided to each entity creating a virtual appliance requiring that particular operating system. Next, in one or more embodiments, to create a virtual appliance, a configuration file is created that includes reference to the file (e.g., a virtual disk) that includes the operating system and reference to one or more files necessary to execute the application that is intended to be part of the virtual appliance (e.g., an application file disk, data disks, etc.). Next, the configuration files, the operating system file, and one or more files for the application are packaged together to form a product that is the virtual appliance, which may then be distributed to entities seeking to use the virtual appliance. In one or more embodiments, if the virtual appliance needs to be modified in any way after a user deploys the virtual appliance, an initialization file (e.g., a script) may be included in the product package (e.g., added to the operating system file) to be executed once the operating system boots. Such modifications may include, for example, the removal of portions of the installed operating system that are not necessary for the execution of the application of the virtual appliance.

In one or more embodiments, generating a hardened and/or optimized operating system once reduces time and effort what would otherwise be spent by creators of virtual appliances having to each duplicate the same effort with respect to the operating system.

Figure 1:
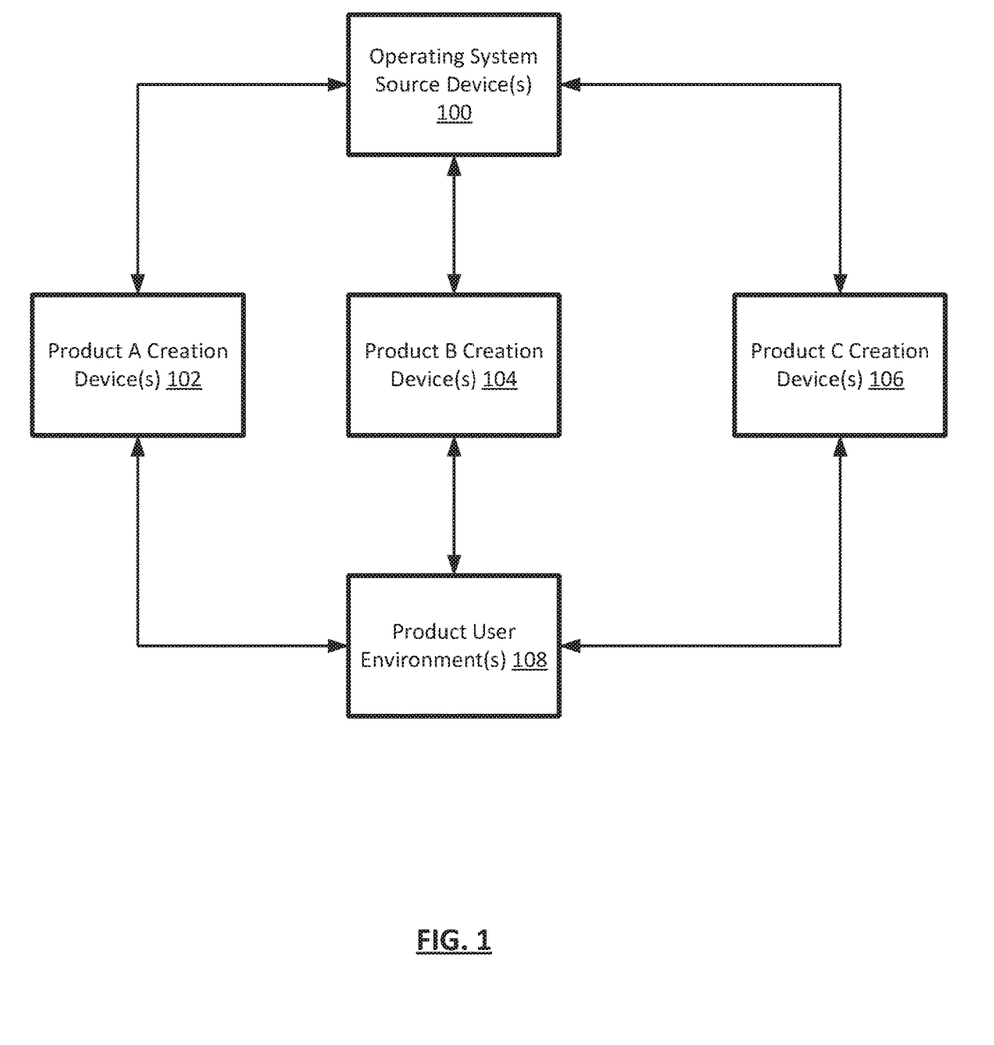
FIG. 1 shows a diagram of a system in accordance with one or more embodiments of the invention.

FIG. 1 shows a diagram of a system in accordance with one or more embodiments of the invention. The system may include any number of operating system source devices (e.g., operating system source device(s) (100)), any number of product creation devices (e.g., product creation device A (102), product creation device B (104), product creation device C (106)), and any number of product user environments (108).

In one or more embodiments, operating system source devices (100), product creation devices (102, 104, 106), and product user environments are and/or include one or more computing devices. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (not shown), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, an operating system source device (100) is operatively connected to product creation devices (102, 104, 106). Such an operative connection may be a direct connection (e.g., via a cable facilitating the transfer or information) or may be over a network (not shown). In one or more embodiments, a network includes a collection of one or more network devices that facilitate network connectivity for one or more operatively connected devices (e.g., computing devices, data storage devices, etc. (not shown)). As used herein, a network may be an entire network or any portion thereof (e.g., a logical area of network devices within the network). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet. Similarly, in one or more embodiments, product creation devices (102, 104, 106) may be operatively connected to any number of product user environments (108).

In one or more embodiments, an operating system source device (100) is a computing device configured to provide copies of one or more operating systems to any number of product creation devices (102, 104, 106). In one or more embodiments, an operating system includes any software and/or firmware for managing the virtual and/or physical resources (e.g., hardware, other software, etc.) of one or more computing devices. More specifically, an operating system may be a program or set of programs that manages all or any portion of the other software (e.g., applications, agents, etc.) in a computing device (e.g., a virtual machine), as well as all or any portion of the virtual and/or physical hardware of a computing device (e.g., processors, network interfaces, memory, storage, etc.). Management by an operating system may include scheduling, hardware allocation, application execution, network access, management of access to stored files that are selectively made available to applications running on the operating system, etc. An operating system may also manage and enforce settings and permissions customized for specific applications running within the OS. Examples of operating systems include, but are not limited to, Windows operating systems, Linux-based operating systems (e.g., Red Hat, SUSE, Ubuntu, etc.), macOS, iOS, Android, various disk operating systems (DOS) operating systems, etc.

In one or more embodiments, the operating system source device (100) is configured to modify an operating system to obtain a hardened operating system. In one or more embodiments, a hardened operating system, as used herein, is any operating system that has been modified from its original form to achieve desired goals relating to the state of the operating system once deployed. Accordingly, hardening an operating system may include modifying security settings, adding security software, updating and/or upgrading the operating system, applying security patches, deleting unnecessary files, adding files to assist with security, installing various certificates (e.g., federal compliance certificates).

In one or more embodiments, an operating system source device (100) may be a single computing device. Additionally or alternatively, an operating system source device (100) may be a system of any number of computing devices working in conjunction with one another to provide an operating system to product creation devices (102, 104, 106). In one or more embodiments, an operating system source device (100) is configured to provide a specific operating system (hardened or not) to product creation devices (102, 104, 106). Additionally or alternatively, an operating system source device (100) may be configured to harden and provide to product creation devices any number of different operating systems. In one or more embodiments, an operating system source device (100) may be configured to provide different types of hardening depending on what is needed by a product creation device that is to receive the hardened operating system.

In one or more embodiments, an operating system source device (100) is configured to provide any number of operating systems with any amount of hardening to any number of product creation devices (102, 104, 106). In one or more embodiments, as described above, a product creation device (102, 104, 106) is any one or more computing devices. In one or more embodiments, the operating system may be provided in any format suitable for the transfer of the data that is the operating system. For example, the operating system may be delivered as a virtual disk file (e.g., a vmdk file), a disk image (e.g., an ISO file), or any other format capable of including an operating system and being provided to a product creation device (102, 104, 106). Regardless of the format of the operating system file(s) to be provided to a product creation device, the file may or may not be delivered in a compressed manner. In one or more embodiments, a compressed operating system file may take less time to transmit, but may have to be uncompressed by the product creation device.

In one or more embodiments, a product creation device is operatively connected to any number of operating system source devices (100), and to any number of product user devices (108). In one or more embodiments, a product creation device is includes functionality to create a product, which may be referred to as a virtual appliance. To that end, a product creation device (102, 104, 106) may be configured to obtain an operating system (e.g., a hardened operating system) from an operating system source device (100), and combine the operating system with other data to create the virtual appliance. In one or more embodiments, a virtual appliance may include an operating system and any data added by a product creation device, to be distributed as a virtual appliance product. In one or more embodiments, data added by a product creation device may be logically stored separately from the operating system data. For example, the operating system may be one virtual disk file, and the additional data added by the product creation device may be stored as one or more separate virtual disk files. Virtual appliance products are discussed further in the description of FIG. 2, below.

In one or more embodiments, a product user environment (108) is any one or more computing devices on which a virtual appliance product may be deployed. For example, a product user environment (108) may be a data center with servers, network devices, storage devices, etc. in which at least some of the aforementioned data center components are being utilized by virtualization software. In such an environment, servers may be executing hypervisors configured to facilitate the execution of virtual machines. As such, in one or more embodiments, a virtual appliance product obtained from a product creation device (102, 104, 106) may be deployed as a virtual machine within the virtualized environment within such a data center. For example, the virtual appliance product may be delivered to a product user environment (108) in a format that can be used and/or executed to cause deployment of the operating system, software, and data of the virtual appliance product. In such a scenario, there may be management software (e.g., VMware's vCenter) from which a user may use a virtual appliance product to deploy the virtual appliance as a virtual machine, thereby gaining the ability to utilize the functionality offered by the virtual appliance. As another example, a product user environment (108) may be a single computing device configured with appropriate software to deploy a virtual appliance product. Other examples of product user environments may be used without departing from the scope of this invention.

While FIG. 1 shows a configuration of components, other configurations may be used without departing from the scope of embodiments described herein. For example, there may be any number of operating system source devices each providing and/or hardening any number of operating systems. As another example, there may be any number of product creation devices. As another example, there may be any number of product user environments. As another example, there may be any number of components, software instances, etc. that are not shown in FIG. 1. Accordingly, embodiments disclosed herein should not be limited to the configuration of components shown in FIG. 1.

Figure 2:
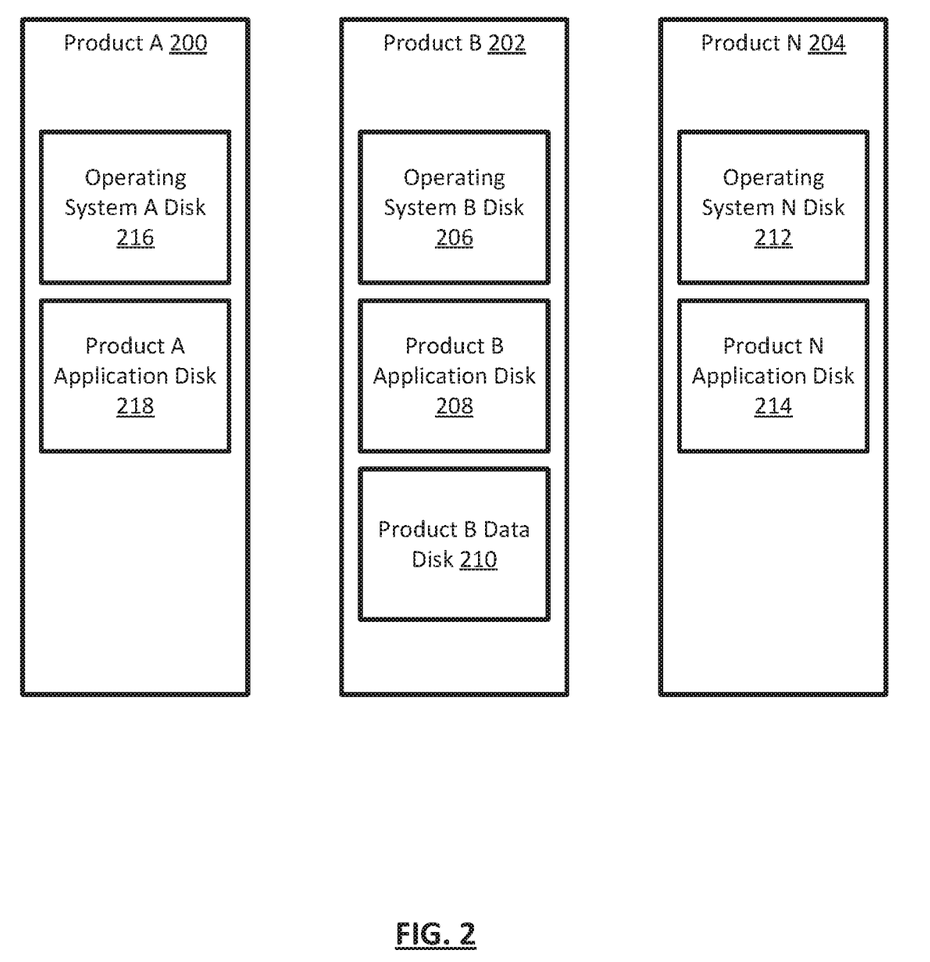
FIG. 2 shows a set of virtual appliance products in accordance with one or more embodiments of the invention.

FIG. 2 shows three example virtual appliance products (e.g., product A (200), product B (202), product N (204)) in accordance with one or more embodiments of the invention.

As shown in FIG. 2, product A (200) includes an operating system A disk (216) and a product A application disk (218). Each of the disks may be virtual disks to be included as separate virtual disks of a virtual machine when deployed. The operating system A disk (216) may be a disk obtained by a product creation device from an operating system source device (discussed above in the description of FIG. 1). In one or more embodiments, the operating system A disk (216) may be a hardened version of any operating system. In one or more embodiments, the product A application disk (218) may be any set of files configured as a separate virtual disk that are necessary to use the application of the virtual appliance product A (200).

In one or more embodiments, the application of a virtual appliance product may be any application for performing any action, service, etc. that may be desired by a user of a virtual appliance product. Examples of applications that may be included, along with an operating system, as part of a virtual appliance product include, by are not limited to: data backup applications; data domain applications; web server applications; content delivery applications, security applications; networking services applications; domain controller applications; email server applications; document management applications; educational services applications; content publishing applications; management applications; monitoring applications; file server applications; file sharing applications; project management applications; cloud management applications; software development applications, load balancing applications, database applications; etc. Any other type of application may be included in a virtual appliance product without departing from the scope of the invention.

In one or more embodiments, virtual appliance product B (202) is substantially similar to product A (200), having an operating system B disk (206) and a product B application disk (208). In one or more embodiments, however, product B (202) also includes a separate product B data disk (210), which is a separate virtual disk that stores data necessary for the execution of the product B application on the product B application disk (208).

Similarly, in one or more embodiments, product N (204) is substantially similar to product A, having an operating system N disk (212) and a product N application disk (214).

In one or more embodiments, any operating system on an operating system disk may be combined in a virtual appliance product with any product application. As such, in one or more embodiments, product A (200), product B (202), and product N (204) may all have the same operating system, may have different operating systems, or any combination thereof. The operating systems may have had the same hardening performed by an OS source device, or may have differing levels of hardening depending on what is required for a given virtual appliance product.

For example, product A (200) and product N (204) may have the same product application, but different operating systems, thereby suiting the needs or desires of different customer users of the virtual appliance products. As another example, product A (200) and product N (204) may have the same operating system, hardened in the same manner, but have different product applications.

Although not shown in FIG. 2, a virtual appliance product (200, 202, 204) may include any additional data or information necessary to allow the virtual appliance product to be deployed as a virtual machine in a product user's environment. Examples of what may be included in a virtual appliance product besides an operating system disk and a product appliance disk include, but are not limited to, one or more configuration files, information regarding virtual hardware, information regarding network configuration, information about the operating system, information about the product application, one or more descriptor files with information about the virtual appliance product, a listing of the virtual disks (e.g., operating system disk, product appliance disk(s), data disk(s), etc.), certificate files, scripts, any other files or data, or any combination thereof.

As an example, a product creation device may obtain an operating system disk as a virtual disk file that includes a hardened operating system from an operating system source device. The product creation device may then create a directory that includes the operating system virtual disk files, any number of virtual disks for the product application, any number of data virtual disks to facilitate operation of the product application, and a descriptor file (e.g., a .ovf file). Such a directory, with the files therein, may, for example, be an Open Virtualization Format (OVF) package. Such a package may be distributed in that format as the virtual appliance product. Additionally or alternatively, the OVF package may be packaged as a tar archive file for distribution, which may be an Open Virtualization Appliance (OVA) package, which includes the contents of the OVF package. A virtual appliance product may be either an OVF package or an OVA package, either of which may be compressed or not compressed prior to distribution. Additionally or alternatively, a virtual appliance product may be any other format suitable for distributing a virtual appliance product to a user without departing from the scope of the invention.

While FIG. 2 shows a configuration of components, other configurations may be used without departing from the scope of embodiments described herein. For example, a virtual appliance product may have, in addition to an operating system virtual disk, any number of product application virtual disks, any number of data virtual disks, and any other data or information necessary to deploy and operate the virtual appliance product in a product user's environment. Accordingly, embodiments disclosed herein should not be limited to the configuration of components shown in FIG. 2.

Figure 3:
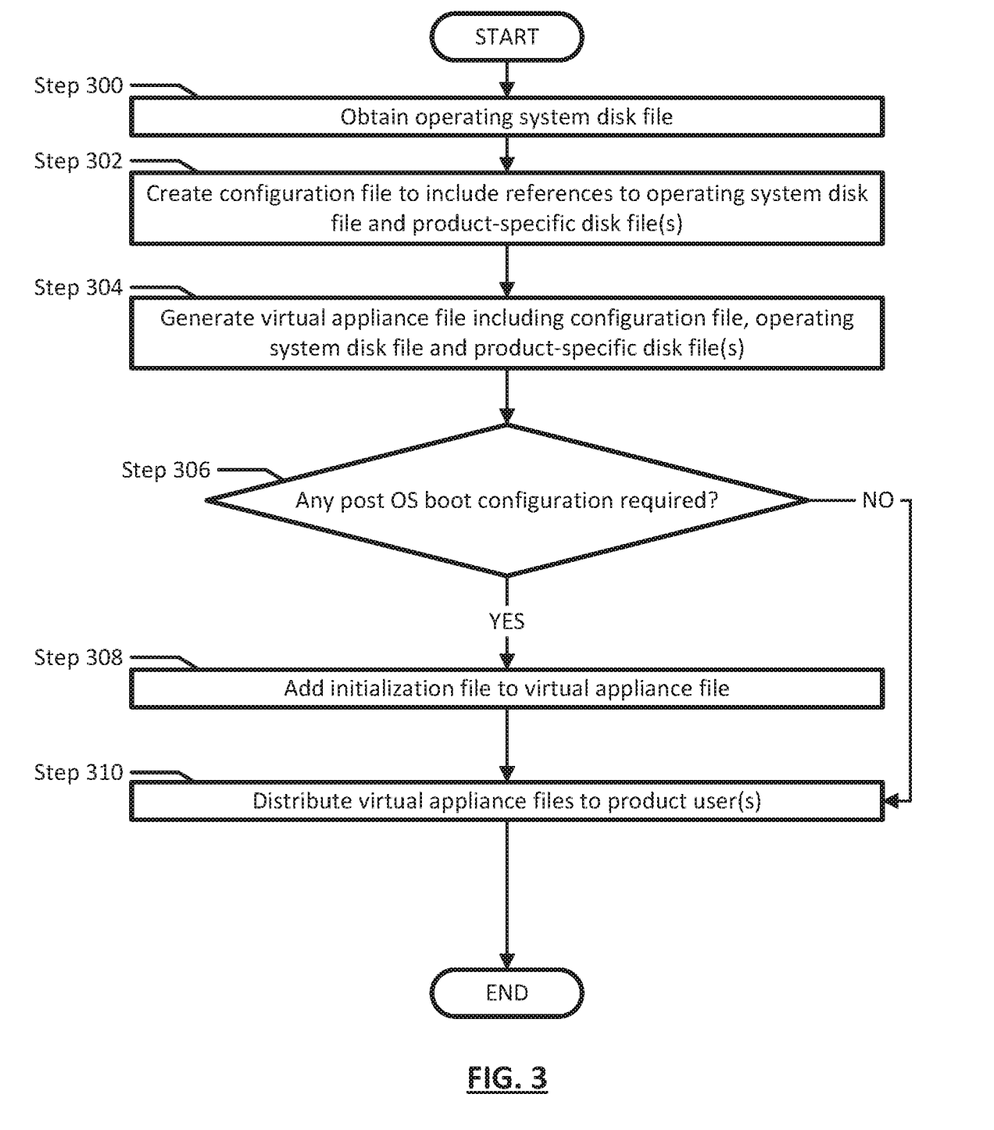
FIG. 3 shows a flowchart in accordance with one or more embodiments of the invention.

FIG. 3 shows a flowchart describing a method for intelligent asset classification in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, an operating system disk file is obtained. In one or more embodiments, the operating system disk file is obtained from an operating system source device. In one or more embodiments, the operating system of the operating system disk file is a hardened operating system. In one or more embodiments, the operating system of the operating system disk file is any operating system required by a product creation team. In one or more embodiments, the operating system disk file is a virtual disk file. In one or more embodiments, the operating system disk file is obtained over a network.

In Step 302, a configuration file for a virtual appliance product is created that includes references to the operating system disk file obtained in Step 300, and to any number of additional virtual disk files needed for the virtual appliance product. In one or more embodiments, such additional virtual disk files may include any number of virtual disk files necessary for the application, as well as any number of additional data disk virtual disk files. In one or more embodiments, the configuration file may also include any number of additional files and/or information necessary for deployment of the virtual appliance product. For example, the configuration file may include any number of descriptor files that include information relevant to the virtual appliance product.

In Step 304, a virtual appliance file is created. In one or more embodiments, the virtual appliance file includes the configuration file created in Step 302, the operating system disk file obtained in Step 300, and any product-specific disk files, which may include application disk files and/or data disk files.

In Step 306, a determination is made as to whether any post operating system boot configuration is required. For example, the operating system disk file obtained in Step 300 may include information that is not necessary for the operation of the virtual appliance product, such as libraries to facilitate programming languages that are not used by the virtual appliance product. In such an example, a script may be added to the operating system disk file to be executed after the operating system boots to remove such unnecessary files once the virtual appliance product is deployed by a user. In one or more embodiments, if no post operating system boot configuration is required, the method proceeds to Step 310. In one or more embodiments, if post operating system boot configuration steps are required, the method proceeds to Step 308.

In Step 308, based on a determination that post operating system booth configuration is required, an initialization file is added to the virtual appliance file. In one or more embodiments, the initialization file is added to the operating system disk file to be executed once the virtual appliance product is deployed and the operating system therein is booted for the first time.

In Step 310, the virtual appliance product file create in Steps 300-308 is distributed to customers to be deployed in a product user environment so that the functionality of the virtual appliance product may be used by the virtual appliance product user. In one or more embodiments, the virtual appliance product is used by the user by executing the virtual appliance product file within a virtualized environment to create a virtual machine configured to operate the virtual appliance product.

Figure 4:
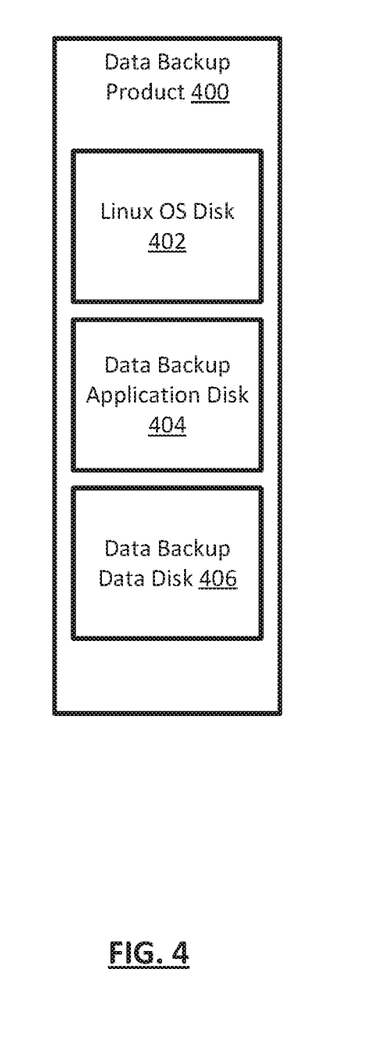
FIG. 4 shows an example in accordance with one or more embodiments of the invention.

FIG. 4 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4, consider a scenario in which a user desires a virtual application product that facilitates data backup services in a data center (e.g., data backup product (400)), and is based on a Linux operating system. In such a scenario, a virtual appliance product team seeks to create such a virtual appliance product for the user. To that end, an operating system source team uses an operating system source device to generate a Linux OS disk (402) that has been hardened to include various modifications, security settings, certificates of compliance, etc. In one or more embodiments, the Linux OS disk is provided as a .vmdk file to a product creation team for use by a product creation device.

In one or more embodiments, the product creation team uses the product creation device to generate a .ovf descriptor file that includes various information related to the OVF package being created, hardware requirements, and information relating to other files in the OVF package being created.

Next, the product creation device is used to create the OVF package, including the .ovf descriptor file, the operating system disk file, a separate virtual disk file for the data backup application (404), and a data backup data disk (406) that includes certain data necessary for the data backup application to perform the data backup services that it is intended to perform.

Next, once the OVF package has been created, the OVF package is converted to an OVA file ready for distribution. In one or more embodiments, once the OVA file has been created, it is distributed to the user that desires data backup services to be deployed as one or more virtual machines in the product user environment of the user.

Figure 5:
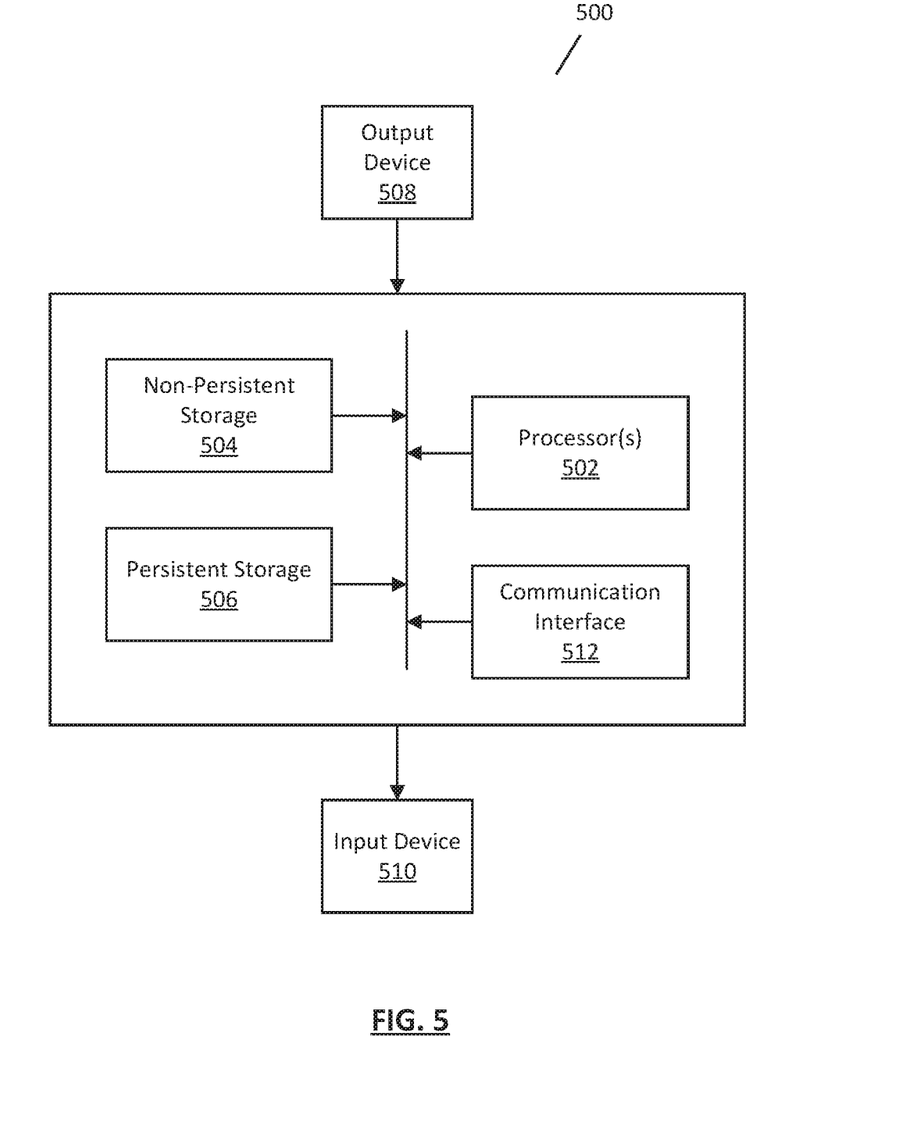
FIG. 5 shows a computing system in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating virtual appliance products, the method comprising:
    obtaining an operating system virtual disk file for a hardened operating system,
        wherein the hardened operating system comprises a compliance certificate;
    creating a configuration file to include a first reference to the operating system virtual disk file and a second reference to a product-specific disk file;
    generating a virtual appliance file comprising the configuration file, the operating system virtual disk file, the product-specific disk file, and an initialization file,
        wherein the initialization file comprises a script for removing information from the operating system virtual disk file once the hardened operating system boots, a booting of the hardened operating system occurring on a deployed virtual appliance,
        wherein the information is not necessary for operations of the deployed virtual appliance and comprises a programming language library; and
    distributing the virtual appliance file to a user.

2. The method of claim 1, wherein the hardened operating system further comprises an operating system update, a modification to at least one security setting, a security patch, security software, and at least one file that assists with security.

3. The method of claim 1, wherein the user executes the virtual appliance file to obtain the deployed virtual appliance.

4. The method of claim 1, the method further comprising:
    modifying the configuration file to include a third reference to a data disk file related to the product-specific disk file.

5. The method of claim 1, the method further comprising:
    creating a second configuration file to include a third reference to the operating system virtual disk file and a fourth reference to a second product-specific disk file;
    generating a second virtual appliance file comprising the second configuration file, the operating system virtual disk file, and the second product-specific disk file; and
    distributing the second virtual appliance file to a second user.

6. A non-transitory computer readable medium comprising computer readable program code, which when executed by a computer processor enables the computer processor to perform a method for generating virtual appliance products, the method comprising:
    obtaining an operating system virtual disk file for a hardened operating system,
        wherein the hardened operating system comprises a compliance certificate;
    creating a configuration file to include a first reference to the operating system virtual disk file and a second reference to a product-specific disk file;
    generating a virtual appliance file comprising the configuration file, the operating system virtual disk file, the product-specific disk file, and an initialization file,
        wherein the initialization file comprises a script for removing information from the operating system virtual disk file once the hardened operating system boots, a booting of the hardened operating system occurring on a deployed virtual appliance,
        wherein the information is not necessary for operations of the deployed virtual appliance and comprises a programming language library; and
    distributing the virtual appliance file to a user.

7. The non-transitory computer readable medium of claim 6, wherein the hardened operating system further comprises an operating system update, a modification to at least one security setting, a security patch, security software, and at least one file that assists with security.

8. The non-transitory computer readable medium of claim 6, wherein the user executes the virtual appliance file to obtain the deployed virtual appliance.

9. The non-transitory computer readable medium of claim 6, the method further comprising:
    modifying the configuration file to include a third reference to a data disk file related to the product-specific disk file.

10. The non-transitory computer readable medium of claim 6, the method further comprising:
    creating a second configuration file to include a third reference to the operating system virtual disk file and a fourth reference to a second product-specific disk file;
    generating a second virtual appliance file comprising the second configuration file, the operating system virtual disk file, and the second product-specific disk file; and
    distributing the second virtual appliance file to a second user.

11. A system for generating virtual appliance products, the system comprising:
    a processor;
    a memory; and
    a product creation device executing on the processor and configured to:
        obtain an operating system virtual disk file for a hardened operating system,
            wherein the hardened operating system comprises a compliance certificate;
        create a configuration file to include a first reference to the operating system virtual disk file and a second reference to a product-specific disk file;
        generate a virtual appliance file comprising the configuration file, the operating system virtual disk file, the product-specific disk file, and an initialization file,
            wherein the initialization file comprises a script for removing information from the operating system virtual disk file once the hardened operating system boots, a booting of the hardened operating system occurring on a deployed virtual appliance, wherein the information is not necessary for operations of the deployed virtual appliance and comprises a programming language library; and distribute the virtual appliance file to a user.

12. The system of claim 11, wherein:

the hardened operating system further comprises an operating system update, a modification to at least one security setting, a security patch, security software, and at least one file that assists with security.

13. The system of claim 11, wherein the user executes the virtual appliance file to obtain the deployed virtual appliance.

14. The system of claim 11, wherein the product creation device is further configured to modify the configuration file to include a third reference to a data disk file related to the product-specific disk file.

15. The system of claim 11, wherein the product creation device is further configured to:

create a second configuration file to include a third reference to the operating system virtual disk file and a fourth reference to a second product-specific disk file;

generate a second virtual appliance file comprising the second configuration file, the operating system virtual disk file, and the second product-specific disk file; and distribute the second virtual appliance file to a second user.

\* \* \* \* \*